United States Patent
Liu et al.

(10) Patent No.: US 10,947,385 B2
(45) Date of Patent: Mar. 16, 2021

(54) DUAL CURE ORGANOPOLYSILOXANE COMPOSITION

(71) Applicant: Dow Silicones Corporation, Midland, MI (US)

(72) Inventors: Junying Liu, Midland, MI (US); Kent Larson, Midland, MI (US); Joel McDonald, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/496,520

(22) PCT Filed: May 30, 2018

(86) PCT No.: PCT/US2018/035069
§ 371 (c)(1),
(2) Date: Sep. 23, 2019

(87) PCT Pub. No.: WO2019/005393
PCT Pub. Date: Jan. 3, 2019

(65) Prior Publication Data
US 2020/0283630 A1    Sep. 10, 2020

Related U.S. Application Data

(60) Provisional application No. 62/527,264, filed on Jun. 30, 2017.

(51) Int. Cl.
*C08L 83/08*    (2006.01)

(52) U.S. Cl.
CPC .......... *C08L 83/08* (2013.01); *C08L 2205/025* (2013.01); *C08L 2205/035* (2013.01)

(58) Field of Classification Search
CPC .......... C08L 83/08; C08G 77/28; C08G 77/20; C08G 77/18
See application file for complete search history.

(56) References Cited

U.S. PATENT DOCUMENTS 4,528,081 A    7/1985    Lien
2004/0209972 A1    10/2004    Chambers et al.

FOREIGN PATENT DOCUMENTS

| CN | 103980496 | | 8/2014 |
| CN | 103992650 | * | 8/2014 |
| CN | 105754544 | | 7/2016 |

OTHER PUBLICATIONS

CN 103992650 machine translation (2008).*

* cited by examiner

*Primary Examiner* — Kuo Liang Peng

(57) ABSTRACT

The present invention relates to organopolysiloxane compositions which exhibits both UV and moisture initiated curing.

10 Claims, No Drawings

DUAL CURE ORGANOPOLYSILOXANE COMPOSITION

The present invention relates to dual curing silicone compositions which are capable of cross-linking when subjected to radiation in the ultraviolet ("UV") region of the electromagnetic spectrum and by a moisture condensation method and applications using such compositions.

Silicone rubber and liquid compositions exist in various forms and their characteristics may be modified to impart specific characteristics such as cure chemistry, viscosity, polymer type and purity. They can be formulated into one-part or two-part systems and a particular silicone composition can be engineered to be cured by more than one mechanism. Moisture-curing mechanisms, heat-curing mechanisms, and photoinitiated curing mechanisms are among those mechanisms used to initiate cure, i.e., cross-linking of reactive silicones. These mechanisms are based on either condensation reactions, whereby moisture hydrolyzes certain groups on the silicone backbone, or addition reactions which can be initiated by a form of energy, such as electromagnetic radiation or heat. For example, reactive organopolysiloxanes can be cured by heat in the presence of a peroxide, or they can be cured by heat in the presence of a silicon hydride-containing (SiH) compound and a metallic hydrosilylation catalyst, such as an organo-platinum catalyst.

Typically, moisture curable materials are manufactured by endcapping α,ω-silanol terminated silicones with various crosslinkers such as alkoxysilanes, oximinosilanes, acetoxysilanes, aminosilanes, and other silanes with hydrolyzable groups attached to the silicon atom(s) thereof. The resulting silicone materials are stored in moisture impermeable containers.

During application to a respective substrate, the materials are extruded or otherwise applied and exposed to ambient conditions for curing. The moisture in the air then will hydrolyze the hydrolyzable groups (such as alkoxy, oximino, acetoxy, and amino) on the silicon atom(s) to form silanol, either with or without inclusion of a catalyst. The resulting silanol can then further react with remaining unhydrolyzed groups in a condensation reaction, to form a siloxane linkage resulting in the cure of the silicone material.

Although these materials when cured are very reliable and possess superior properties as coatings, the moisture cure tends to be slow. Cure times of 24 hours or more may often be needed before a full cure can be achieved. Such cure times limit through-put in the manufacture of coated components, since full cure of the coated components may be needed before the components can be used in the next step of the manufacture process.

As a result, a third curing mode, ultraviolet light curing, has gained wide acceptance in recent years. The curing is relatively fast, with the cured elastomer showing better adhesion to the substrates. In situations where portions of the coated material are shaded during the UV cure, a secondary cure mode, usually moisture cure can be further incorporated.

Typically, UV cure of silicone compositions can be achieved by either a thiol-ene cure or by an acrylate cure. In the thiol-ene cure, a thiol functional silicone is reacted with an alkenyl functional silicone. The cure is fast and the surface dry to the touch upon the completion of the cure. However, it has been reported that in commercial applications the cured product does not heat age well, and the uncured composition tends to have poor adhesion, lack long-term storage stability, and have objectionable odor.

On the other hand, acrylate functional silicone is usually storage stable and the cured products exhibit excellent high temperature resistance up to temperatures of 125° C. However, with an acrylate cure in the presence of atmospheric oxygen, the surface cure tends to be incomplete and the cured product often times tends to be tacky and brown in color.

Dual-curing silicone compositions using UV light and moisture curing mechanisms are disclosed in U.S. Pat. No. 4,528,081 (Lien). This reference discloses compositions particularly useful for conformal coatings in electronic applications where the substrate has shadow areas which are not readily accessible to direct UV light and require moisture cure for cross-linking of those areas. Ordinarily, in addition to the photoinitiator present for radiation polymerization, a moisture curing catalyst such as an organotitanate or organotin is present. Without the moisture curing catalyst, moisture cure does not ordinarily take place with any degree of certainty or in any predictable time frame. Thus, as a practical matter, without the moisture curing catalyst, the moisture curing aspect of these compositions would not be practical for commercial use.

Notwithstanding the state-of-the-art, it would be desirable to provide a dual UV-curable, moisture-curable silicone composition where cure of the composition by UV results in a coating that is dry to the touch without the common tacky surface often associated with an acrylate cure. It would also be desirable to provide such compositions having at least one siloxane which has the ability to both photocure and cure through exposure to moisture.

The present invention provides compositions which cure through a dual-curing mechanism. According to the present invention, a dual cure organopolysiloxane composition, comprising a first organopolysiloxane having at least two mercapto functional groups; and a second organopolysiloxane have alkenyl groups and trialkoxysilyl groups. These compositions can be used in coatings, adhesives, and encapsulation applications.

As a first element of the composition of the present invention, an organopolysiloxane having at least two mercaptoalkyl functional groups in polymer is provided. The first organpolyosiloxane may or may not have terminal mercapto groups. Preferably the first organpolyosiloxane does not comprise terminal mercapto groups. The first organopolysiloxane comprises at least one unit of the formula:

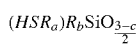

Wherein Ra represents a divalent hydrocarbon group, Rb represents alkyl, aryl, H, hydroxyl or alkoxy containing group, c is 0, 1 or 2. The preferred SH content in this organopolysiloxane is 0.5-35 weight percent. Alternatively, Ra is a divalent hydrocarbon group with 1-8 carbons, Rb is a $C_{1-8}$ alkyl group or phenyl moiety or alkoxy moiety. The first organopolysiloxane is generally present in the dual cure silicone composition in an amount from 1 to 90 weight percent.

As a second element of the composition of the present invention, an organpolyosiloxane having both alkenyl groups and trialkoxysilyl groups is provided. The second organopolysiloxane is made as a product of alkenyl-functionalized polysiloxanes and a stoichiometric less amount of trialkoxysilyl functionalized silane in the presence of hydrosilation catalyst. These second organopolysiloxanes are generally described by the following formula:

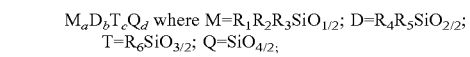

where R is independently alkyl, aryl, H, hydroxyl, alkoxy, and alkenyl containing groups; where at least one R is a trialkoxysilyl containing group and at least one R is alkenyl containing group; and a+b+c+d=1. Such compositions are generally present in the dual cure silicone composition in an amount from 2 to 90 weight percent.

The resultant organopolysiloxane composition of the present invention is a dual-cure composition. As such the composition is subject to two curing mechanisms. The dual-cure organopolysiloxane may be UV cured, moisture cured, or a combination of the two cure techniques.

The UV cure mechanism in this formulation is suitably free-radical cure. The photoinitiators useful in the present invention may be selected from any known free radical type photoinitiator effective for promoting crosslinking reactions. For example, suitable photoinitiators include UV initiators such as benzophenone and substituted benzophenones, acetophenone and substituted acetophenones, benzoin and its alkylesters, xanthone and substituted xanthones. Desirable photoinitiators include diethoxyacetophenone (DEAP), benzoin methyl ether, benzoin ethyl ether, benzoin isopropyl ether, diethoxyxanthone, chloro-thioxanthone, azo-bisisobutyronitrile, N-methyl diethanolaminebenzophenone, and combinations thereof. The selection of photo initiator depends on the application thickness, UV wavelength, cure speed, and compatibility with formulation etc. For UV wavelength lower than 350 nm, alpha hydroxyketone type may suitably be employed. The photoinitiator may be present in any effective amount, desirable ranges include about 0.1 to about 5% by weight, such as about 0.2 to about 1% by weight.

The compositions may also include moisture curing catalysts to enhance the rate at which the hydrolyzable groups on the organopolysiloxane react with moisture to cure.

The moisture curing catalysts include organo-metal catalysts including titanates such as tetraisopropylorthotitanate and tetrabutoxyorthotitanate, as well as metal carboxylates such as dibutyltin dilaurate, dibutyltin dioctoate and the like. A particularly suitable moisture curing catalyst is diisopropoxytitanium bis(ethylacetoacetate). The moisture cure catalyst should be used in an amount sufficient to effectuate moisture cure, which desirably is in the range of about 0.1 to about 5% by weight.

Useful UV radiation sources include conventional mercury-vapor lamps designed to emit ultraviolet energy in various ultraviolet wavelength bands, LED curing lamp etc. For example, useful radiation wavelength ranges include 200 to 400 nm.

The inventive compositions may also contain other additives so long as they do not interfere with the curing mechanisms. For example, conventional additives such as fillers, adhesion promoters, resins, pigments, moisture scavengers, fluorescent dye, inhibitors and the like may be included.

Fillers such as fumed silica or quartz are contemplated. Fillers may be present in amounts up to about 30% by weight, such as about 4 to about 20% by weight.

Inhibitors may be present up to about 5% by weight, desirably about 0.001 to about 1% by weight. The particular amount of inhibitor should be balanced in a given composition to produce or improve stability of the composition.

Adhesion promoters may be present in amounts of up to about 5%, such as about 0.5% by weight.

UV cure is generally effected in the range of 40 milliwatts/cm$^2$ ("mW/cm$^2$") to about 300 mW/cm$^2$, such as in the range of about 70 mW/cm$^2$ to about 300 mW/cm$^2$.

The compositions of the present invention may be prepared by mixing together the respective components to obtain a substantially homogenous or uniformly blended material and stored in containers which are non-transmissive to UV light and moisture. Generally, a single package system is employed, but two-part package systems may be used if desired. Whereas single package products are ready-for-use upon being dispersed, two-part systems require mixing of the dispersed parts prior to use.

The inventive compositions may be used as noted above in potting applications and coatings, encapsulations, gels for a variety of substrates including electronic parts and other heat-sensitive materials.

The following examples are provided for illustrative purposes only, and are in no way intended to limit the scope of the present invention.

EXAMPLES

Synthesis of Dual Cure Siloxane A

Alkenyl containing polydimethylsiloxane (306 g, 1.2 wt % vinyl)(1 stoichiometric vinyl) was mixed with the 19 g HMe$_2$SiOSiMe$_2$C$_2$H$_4$Si(OMe)$_3$ (0.5 stoichiometric SiH) and then treated with 10 ppm of Pt catalyst. The reaction was allowed to proceed at room temperature for 5 hours. The IR and NMR showed the disappearance of the SiH peak indicating the completion of the reaction.

Formulation Preparation:

Formulation A:

To a 100 ml dental mixer: mercapto containing siloxane (8 g, 3.5 wt % SH), dimethylvinylated silicone resin (10 g, 0.42 wt % vinyl content), vinyl terminated polydimethylsiloxane (10 g, 0.45 wt % vinyl content), dual cure siloxane A (4 g, 0.6 wt % vinyl content) and methyltrimethoxy silane (0.2 g) were added. The composition was mixed at 2000 rpm for 60 seconds; followed by the addition of photoinitiator 2-hydroxyl-2-methyl-l-phenyl-1-propanone (0.3 g), and butylated hydroxytoluene (0.06 g). The mixture was then mixed at 2000 rpm for 30 s. Diisopropoxytitanium bis (Ethylacetoacetate) (0.3 g) was then added. The final formulation was mixed under 2000 rpm for 60 s.

Formulation B:

Similar as Example A, except that 10 g of dual cure siloxane A and 0.5 g methyltrimethoxy silane were added in the formulation.

Formulation C:

Similar as Example A, except that 20 g of dual cure siloxane A and 1 g methyltrimethoxy silane were added in the formulation.

Comparative Formulation D:

To a 100 ml dental mixer: mercaptopropyl and dimethoxysilyl terminated polydimethylsiloxane (12.3 g, 1.5 wt % SH), dimethylvinylated silicone resin (10 g, 0.42 wt % vinyl content), vinyl terminated polydimethylsiloxane (10 g, 0.45 wt % vinyl content) were added. The mixture was mixed at 2000 rpm for 60 seconds; followed by the addition of photoinitiator 2-hydroxyl-2-methyl-1-phenyl-1-propanone (0.3 g), and butylated hydroxytoluene (0.06 g). The mixture was mixed at 2000 rpm for 30 s. Diisopropoxytitanium bis(Ethylacetoacetate) (0.3 g) was then added. The final formulation was mixed under 2000 rpm for 60 s Comparative Formulation E:

To a 100 ml dental mixer: mercaptopropyl and dimethoxysilyl terminated polydimethylsiloxane (4 g, 1.5 wt % SH), mercapto containing siloxane (5.3 g, 3.5 wt % SH), dimethylvinylated silicone resin (10 g, 0.42 wt % vinyl content), vinyl terminated polydimethylsiloxane (10 g, 0.45 wt % vinyl content) were added. The mixture was mixed at 2000 rpm for 60 seconds; followed by the addition of photoinitiator 2-hydroxyl-2-methyl-l-phenyl-1-propanone (0.3 g), and inhibitor butylated hydroxytoluene (0.06 g). The mixture was mixed at 2000 rpm for 30 s. Diisopropoxytitanium bis(Ethylacetoacetate) (0.3 g) was then added. The final formulation was mixed under 2000 rpm for 60 s

TABLE 1

| Formulation | A | B | C | Comparative D | Comparative E |
|---|---|---|---|---|---|
| Dimethyl, Methyl(mercaptopropyl) Siloxane (3.5 wt % SH content) | 8.0 | 8.2 | 8.6 | 0 | 5.3 |
| mercaptopropyl and dimethoxysilyl terminated polydimethylsiloxane (1.5 wt % SH content) | 0 | 0 | 0 | 12.3 | 4 |
| Dimethylvinylated and Trimethylated Silicone Resin (0.42 wt % Vinyl content) | 10 | 10 | 10 | 10 | 10 |
| vinyl terminated polydimethylsiloxane (0.45 wt % vinyl content) | 10 | 10 | 10 | 10 | 10 |
| Dual Cure Siloxane A | 4 | 10 | 20 | 0 | 0 |
| Methyltrimethoxysilane | 0.2 | 0.5 | 1 | 0 | 0 |
| 2-hydroxyl-2-methyl-l-phenyl-1-propanone | 0.3 wt % | | | | |
| Butylated hydroxytoluene | 0.06 wt % | | | | |
| Diisopropoxytitanium Bis(Ethylacetoacetate) | 0.3 wt % | | | | |
| UV exposure area 2 J/cm2 UV irradiation | Cured | Cured | Cured | Tacky | Cured |
| Shadow area 24 hr. r.t. | cured | cured | cured | not cured | not cured |
| 72 hr. r.t. | cured | cured | cured | cured | cured |
| Mechanical Property after UV and moisture cure — Shore A Hardness | 31 | 22 | 20 | 21 | 24 |

What is claimed is:

1. A dual cure organopolysiloxane composition, comprising:
   (A) A first organopolysiloxane having at least two mercapto functional groups and that is free of terminal mercapto groups; and
   (B) A second organopolysiloxane having at least one alkenyl group and at least one trialkoxysilyl group.

2. The composition of claim 1 wherein the first organopolysiloxane comprises at least one unit of the formula:

$$(HSR_a)R_b SiO_{3-c/2}$$

wherein Ra represents a divalent hydrocarbon group, Rb represents alkyl, aryl, H, hydroxyl or alkoxy containing group; c is 0, 1 or 2.

3. The composition of claim 2 wherein the SH content is 0.5-35 weight percent based on first organopolysiloxane weight.

4. The composition of claim 2 wherein Ra is divalent hydrocarbon group with 1-8 carbons, Rb is a $C_{1-8}$ group or phenyl moiety or alkoxy moiety.

5. The composition according to claim 1 wherein first organopolysiloxane is present in the dual cure organopolysiloxane composition in an amount from 1 to 90 weight percent.

6. The composition of claim 1 wherein the second organopolysiloxane is represented by the following formula:

$$M_a D_b T_c Q_d$$

wherein $M=R_1 R_2 R_3 SiO_{1/2}$; $D=R_4 R_5 SiO_{2/2}$; $T=R_6 SiO_{3/2}$; $Q=SiO_{4/2}$; further wherein $R_1$ to $R_6$ independently alkyl, aryl, H, hydroxyl, alkoxy, alkenyl containing groups; wherein at least one $R_1$ to $R_6$ is trialkoxysilyl containing group and at least one $R_1$ to $R_6$ is alkenyl containing group; and $a+b+c+d=1$.

7. The composition according to claim 1, wherein the second organopolysiloxane is present in amounts of 2% to 90% by weight of the composition.

8. The composition according to claim 1, further comprising a photoinitiator.

9. The composition according to claim 8, further comprising a moisture cure catalyst.

10. The composition according to claim 1, further comprising a moisture cure catalyst.

* * * * *